United States Patent

Mori et al.

(10) Patent No.: US 6,905,753 B2
(45) Date of Patent: Jun. 14, 2005

(54) MAGNETIC RECORDING MEDIUM

(75) Inventors: Masahiko Mori, Kanagawa (JP); Kiyomi Ejiri, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 608 days.

(21) Appl. No.: 09/943,229

(22) Filed: Aug. 30, 2001

(65) Prior Publication Data

US 2004/0072024 A1 Apr. 15, 2004

(30) Foreign Application Priority Data

Aug. 31, 2000 (JP) ........................................ 2000-264329

(51) Int. Cl.$^7$ ............................................... G11B 5/708
(52) U.S. Cl. ........................ 428/141; 428/328; 428/336; 428/694 BA; 428/694 BR
(58) Field of Search ................................. 428/141, 328, 428/336, 694 BA, 694 BR

(56) References Cited

U.S. PATENT DOCUMENTS 6,511,733 B2 * 1/2003 Hayashi et al. ............. 428/145
6,521,361 B2 * 2/2003 Ejiri et al. ............ 428/694 BN
6,660,364 B2 * 12/2003 Yoshida et al. ............. 428/141

FOREIGN PATENT DOCUMENTS

JP     2001325709    * 11/2001

* cited by examiner

Primary Examiner—Stevan A. Resan
(74) Attorney, Agent, or Firm—Stroock & Stroock & Lavan LLP

(57) ABSTRACT

Provided is a particulate magnetic recording medium having good durability and a high C/N ratio in high-density magnetic recording (particularly when employing an MR head for reproduction). A magnetic recording medium which comprises a lower layer comprising a nonmagnetic powder and a binder and a magnetic layer comprising a ferromagnetic powder, an abrasive and a binder provided in this order on a nonmagnetic flexible support. The magnetic layer has a mean thickness d ranging from 0.01 to 0.1 $\mu$m, the ferromagnetic powder contained in the magnetic layer is an acicular ferromagnetic alloy powder having the mean major axis length equal to or less than 0.1 $\mu$m and the saturation magnetization $\sigma$s equal to or less than 120 A·m$^2$/kg, and the number of abrasive protrusions ranging in height from 5 to 10 nm on the surface of the magnetic layer ranges from 15 to 25/225 $\mu$m$^2$.

10 Claims, No Drawings

MAGNETIC RECORDING MEDIUM

FIELD OF THE INVENTION

The present invention relates to a particulate magnetic recording medium for high-density recording.

RELATED ART

Recording wavelengths have tended to shorten as recording densities have increased in recent years. The problem of self-demagnetization loss during recording, where a thick recording layer results in low output, has become substantial. For this reason, recording layers are made thin. However, when a magnetic layer equal to or less than 2 μm is directly coated on a support, the nonmagnetic support tends to affect the surface of the magnetic layer, and electromagnetic characteristics and dropout tend to deteriorate. One way of solving this problem is to employ a simultaneous multilayer coating method to apply a nonmagnetic layer as a lower layer and then apply a thin magnetic coating liquid of high concentration (Japanese Unexamined Patent Publication (KOKAI) Showa Nos. 63-191315 and 63-187418). These inventions have permitted marked improvement in yield and made it possible to achieve good electromagnetic characteristics. Magnetic resistance reproduction heads (MR heads) have been practically applied to hard disks to further increase recording density. In flexible media, there are test results for metal evaporation tapes (ME) (IEEE. Trans. Mag. Vol. 35, No. 2, p. 729 (1999)). However, no magnetic recording medium corresponding to MR heads is known in particulate magnetic recording media.

SUMMARY OF THE INVENTION

Accordingly, it is an object of the present invention to provide a particulate magnetic recording medium exhibiting a high C/N ratio in high-density magnetic recording (particularly when employing an MR head for reproduction) as well as good durability.

DETAILED EXPLANATION OF THE INVENTION

The present inventors examined magnetic recording media suited to reproduction by MR heads in particulate magnetic recording with good production and storage properties, and devised the present invention.

That is, the present invention relates to a magnetic recording medium which comprises a lower layer comprising a nonmagnetic powder and a binder, and a magnetic layer comprising a ferromagnetic powder, an abrasive, and a binder, provided in this order on a nonmagnetic flexible support, wherein the mean thickness d of said magnetic layer ranges from 0.01 to 0.1 μm, said ferromagnetic powder contained in said magnetic layer is an acicular ferromagnetic alloy powder having the mean major axis length equal to or less than 0.1 μm and the saturation magnetization σs equal to or less than 120 A·m²/kg, and the number of abrasive protrusions ranging in height from 5 to 10 nm on the surface of said magnetic layer ranges from 15 to 25/225 μm².

Each of the numerical limits of the present invention will be described here.

First, limiting the thickness of the magnetic upper layer to 0.01 to 0.1 μm is a means of increasing the C/N ratio and resolution of digital recording with an MR head. When the thickness of the magnetic layer exceeds 0.1 μm, output drops due to saturation of the MR head and thickness losses, and the C/N ratio decreases. Conversely, when the thickness of the magnetic layer is less than 0.01 μm, adequate output cannot be achieved and the C/N ratio also drops.

Further, with alloy magnetic powders yielding high performance in conventional inductive heads in particulate media, noises are substantial during reproduction with an MR head and MR elements tend to saturate, making it impossible to achieve high C/N ratios. In the present invention, the use of alloy magnetic powders of relatively low magnetization levels and mean major axis lengths permitted the resolution of the above-described problems. That is, in the present invention, the use of an acicular ferromagnetic powder with a mean major axis length equal to or less than 0.1 μm and a saturation magnetization σs equal to or less than 120 A·m²/kg as the magnetic material permits a reduction in noise during reproduction with MR heads and yields a high C/N ratio.

However, it was found that, when employing a microgranular ferromagnetic powder with the above-stated short mean major axis length, among protrusions on the surface of the magnetic layer as measured by AFM, the number of abrasive protrusions that ranges from 5 to 10 nm in height decreased and still time (life time of still mode) deteriorated.

Accordingly, increasing the amount of abrasive added and keeping the number of abrasive protrusions ranging from 5 to 10 nm in height to 15 to 25/225 μm² ensures still time and permits the manufacturing of a magnetic recording medium exhibiting a high C/N ratio. Still time cannot be ensured at fewer than 15 protrusions per 225 μm², and conversely, the C/N ratio drops when this number exceeds 25/225 μm². Since the filling degree of magnetic particles decreases when the quantity of abrasive that is added is increased, the fill ratio by volume of abrasive particles is desirably equal to or less than 10 percent, from the improvement of the C/N ratio.

Further, the mean particle volume of the microgranular magnetic material is suitably set to 1,500 to 15,000 nm³ from the perspective of reducing noise. Further, the coercivity Hc is desirably equal to or higher than 167 kA/m (2,100 Oe) to maintain stable recording magnetization. When the particle volume is equal to or higher than 1,500 nm³ and the Hc is equal to or higher than 167 kA/m (2,100 Oe), thermal stability of recording magnetization is maintained. When the particle volume is equal to or less than 15,000 nm³, noise is low and an adequate C/N ratio can be achieved. In the present invention, the filling degree of magnetic particles is also an important factor. To further increase the C/N ratio, the fill rate by volume of magnetic particles is preferably equal to or higher than 30 percent.

The magnetic layer of the magnetic recording medium of the present invention will be described in detail below.

In the present invention, the average value d of the thickness of the magnetic layer ranges from 0.01 to 0.1 μm, preferably from 0.03 to 0.08 μm. The object of the present invention can be achieved regardless of whether the magnetic layer is a single layer or multiple layers. In the case of multiple layers, the technique described in Japanese Unexamined Patent Publication (KOKAI) Heisei No. 6-139555 may be applied, for example. Since a state of recording saturation occurs in this technique due to the thin magnetic layer, there would ideally be no variation in recording layer thickness. However, such variation is permissible in practice so long as a relation between the magnetic layer thickness d and the standard deviation σ of the thickness, of σ/d≦0.5, preferably σ/d≦0.3, is satisfied.

One specific method of reducing σ, as described in Japanese Patent No. 2,566,096, is to make the lower layer nonmagnetic coating liquid thixotropic, employ an acicular nonmagnetic powder in the lower layer, and to employ a wet-on-dry method in which the nonmagnetic lower layer is applied and dried, after which the magnetic upper layer is applied.

The level of residual magnetization Φr of the magnetic layer preferably ranges from 5 to 50 mT·μm (50 to 500 G·μm). Φr is optimized within the range at which the MR head employed does not saturate. For example, the relation between Φr in evaporation tapes and saturation magnetization and thickness in MR elements are described in Japanese Unexamined Patent Publication (KOKAI) Heisei No. 10-134306 and in Image Information Media Society Technical Report Vol. 23, No. 78., p. 21 (1999). The particulate medium desirably also satisfies this relation. Examples of ways of setting the above-stated residual magnetization level are varying the amount of binder employed and varying the saturation magnetization of the magnetic material employed. For example, when the magnetization layer is set on the thin side (for example, to equal to or less than 0.05 μm) due to O/W requirements, an alloy powder with a relatively large σs (110 to 120 A·m²/kg) is desirably employed as the magnetic powder.

The fill rate by volume of the ferromagnetic alloy powder in the magnetic layer can be equal to or higher than 30 percent, preferably equal to or higher than 35 percent, and still more preferably equal to or higher than 38 percent.

An alloy powder with a σs equal to or less than 120 A·m²/kg, preferably ranging from 80 to 120 A·m²/kg, and still more preferably from 90 to 110 A·m²/kg, can be employed as the magnetic powder in the present invention. The mean major axis length is equal to or less than 0.1 μm, preferably from 0.03 to 0.08 μm.

The minor axis length can be in the range of from 0.005 to 0.02 μm, preferably from 0.008 to 0.015 μm. The acicular ratio (major axis length divided by minor axis length) can be in the range of from 3 to 15, preferably 5 to 10. The mean particle volume can be in the range of from 1,500 to 15,000 nm³, preferably from 2,000 to 12,000 nm³, and still more preferably from 3,000 to 10,000 nm³. The coercivity Hc is equal to or higher than 2,100 Oe, with a high level being desirable from the principle for recording, but with a level ranging from 2,200 to 3,500 Oe being suitable from a practical standpoint with regard to recording head power.

In addition to prescribed atoms, the following atoms may be contained in the magnetic powder: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and the like. Al, Si, Ta, Y, and the like can be coated on or incorporated in solid solution into the surface to improve thermal stability. In particular, Co, Sm, Nd, or the like may be added in a proportion ranging from 5 to 40 weight percent with respect to Fe to raise the Hc. These magnetic powders may be pretreated prior to dispersion with dispersing agents, lubricants, surfactants, antistatic agents, and the like.

Known binders, such as those described in Japanese Patent Nos. 2,566,096 and 2,571,351, may be employed in the magnetic upper layer. Into these binders, desirably incorporated are functional groups (such as $SO_3M$ and $PO_3M$) promoting adsorption onto the magnetic powder, as well as epoxy groups. The molecular weight thereof can be in the range of from 10,000 to 100,000, preferably from 20,000 to 60,000. The quantity employed can be in the range of from 5 to 25 parts, preferably 5 to 20 parts, and still more preferably from 5 to 15 parts, per 100 parts by weight of magnetic powder.

The following points are desirably considered when adding abrasives to the magnetic layer. However, the present invention is not limited thereto.

(1) Use of microgranular abrasives: So long as the type and added quantity with respect to the magnetic material are identical, when a microgranular abrasive is employed, the number of abrasive protrusions on the surface of the magnetic layer can be increased in inverse proportion to the cube of the ratio of the particle size. Thus, the necessary number of abrasive protrusions on the surface can be ensured and the quantity of abrasive added can be reduced. This permits an increase in the filling degree of the magnetic material, and increases the reproduction output. When the size of the abrasive particles decreases, the height to which they protrude out of the surface diminishes. Here, the particle diameter of the microgranular abrasive, as a mean primary particle diameter, ranges from 0.1 to 0.3 μm, preferably from 0.12 to 0.25 μm, and the quantity added can be in the range of from 2.5 to 25 weight parts, preferably from 2.5 to 12.5 weight parts, and still more preferably from 2.5 to 7.5 parts, per 100 weight parts of ferromagnetic powder.

(2) Making an abrasive in paste form: By making an abrasive in paste form, the abrasive is dispersed in a state in which there is as little aggregation as possible and then added to the magnetic liquid so that the height to which the abrasive protrudes above the surface is uniform. Employing an abrasive of low specific surface area is even more effective. When the binder in the abrasive paste and the binder in the magnetic liquid to which the paste is added are identical or highly compatible, movement of the abrasive particles during coating and drying of the magnetic layer is inhibited. A paste of the binder can be obtained by mixing 2 to 50 weight parts, preferably 5 to 15 weight parts, of binder with 50 to 200 weight parts, preferably 80 to 120 weight parts of solvent per 100 weight parts of abrasive powder, and then dispersing the mixed solution with a sand mill. The abrasive employed preferably causes little sintering (necking) or aggregation of the powder particles, and monodispersed particles as dispersion progresses. For example, although alumina such as Hit 60A, Hit 70, Hit 80, and Hit 82 (product names) from Sumitomo Chemical Co., Ltd. readily forms secondary particles, these products undergo little necking and can be uniformly dispersed into primary particles as dispersion processing progresses. The use of a large quantity of binder relative to the abrasive powder and the use of a binder of high molecular weight such as polyurethane prevent the abrasive particles from rising onto the magnetic layer surface during coating and drying of the magnetic liquid to which the abrasive paste has been added.

(3) Specific gravity of the abrasive: The use of an abrasive of high specific gravity promotes precipitation of abrasive particles during coating and drying of the magnetic layer. When a magnetic coating liquid for forming a magnetic layer is applied on the underside of a support running nearly vertically with an extrusion applicator head so that spray nozzles face upward and if an abrasive of high specific gravity (true specific gravity) is employed, the precipitation of abrasive particles progresses up through the coating and drying of the magnetic layer, resulting in extensive protrusion out onto the magnetic layer surface. For the addition of an identical quantity of abrasive of identical particle diameter, $Cr_2O_3$ produces more protrusions out onto the magnetic layer surface than $Al_2O_3$, SiC, and the like. Conversely, the number of abrasive at the slit end surfaces becomes nonuniform. When the upper magnetic layer is substantially thinner than the lower nonmagnetic layer, resistance to scratching of the slit end surfaces can be achieved through the lower layer. Thus, an abrasive of high specific gravity ($Cr_2O_3$ or the like) is incorporated into the upper layer and an abrasive of lower specific gravity is incorporated into the lower layer, making it possible to ensure both resistance to scratching in the upper layer surface and resistance to scratching at slit end surfaces.

(4) Others: Employing a nonmagnetic powder of specific particle size in the lower layer and adding some other solid additive, the specific particle size permit to increase the number of protrusions on the magnetic layer surface. Further, adjusting the upper layer thickness and thickness ratio of the upper layer/lower layer permit to vary movement of free binder and solvent into the upper layer from the lower layer during coating and drying, and thus to adjust the rising and dropping of abrasive into the upper magnetic layer. The upper magnetic layer can be in the range of from 0.01 to 0.1 μm, preferably from 0.03 to 0.08 μm. The thickness of the upper magnetic and lower layers in total can be in the range of from 0.3 to 3.5 μm, preferably from 1 to 2.5 μm, and still more preferably from 1.2 to 2.2 μm.

The abrasive employed in the magnetic layer will be described in detail next. An inorganic nonmagnetic powder may be employed as the abrasive. The inorganic nonmagnetic powder may be selected from among metal oxides, metal carbonates, metal sulfates, metal nitrates, metal carbides, metal sulfides, and other inorganic compounds, for example. Examples of inorganic compounds are: alumina having an α-conversion rate of from 50 percent to less than 100 percent, such as α-alumina, θ-alumina, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, barium sulfate, and molybdenum disulfate; these may be employed singly or in combination. Particularly preferred is α-alumina comprising some θ phase in part. Calcium carbonate is undesirable because it provides a source of water-soluble calcium ions.

The surfaces of these abrasives may be treated so that at least a portion thereof is coated with $Al_2O_3$, $SiO_2$, $TiO_2$, $ZrO_2$, $SnO_2$, $Sb_2O_3$, ZnO, or MgO. These may be employed singly or in combination.

An abrasive, the surface of which has been treated with magnesium, is preferably employed in the present invention. Such a magnesium-treated abrasive is described in Japanese Patent No. 2,924,094, for example. In the present invention, surface treatment was conducted with an organic magnesium compound and a heat treatment was applied to prepare surface-treated abrasive particles such as alumina particles so that at least a portion of the surfaces thereof were covered with the magnesium compound. Since both magnesium oxides and hydroxides have high isoelectric points of about 12, the use of a magnesium treatment is preferred because it facilitates positive charging of the abrasive surface and increases the adsorption of binder exhibiting acidity.

Increasing an amount of binder adsorption on the abrasive surface results in effects (1) and (2) below and renders the height of the abrasive protrusions protruding from the magnetic layer surface uniform:
(1) Improvement of dispersibility of abrasive particles.
(2) Inhibition of the rising up of abrasive particles during the steps of applying and drying the magnetic liquid.

The abrasives employed in the present invention may be of various types, quantities, particle diameters, combinations, and shapes so as to set the existing density and size of the protrusions on the above-stated magnetic layer to within the above-stated specific ranges. Specific yardsticks relating to various conditions concerning abrasives that can be employed in the present invention are described below. The mean primary particle diameters of these inorganic nonmagnetic powders desirably ranges from 0.1 to 0.3 μm. However, the most desirable are inorganic nonmagnetic powders with mean primary particle diameters ranging from 0.12 to 0.25 μm. The tap density can be in the range of from 0.05 to 2 g/mL, preferably from 0.2 to 1.5 g/mL. The moisture content of the inorganic nonmagnetic powder can be in the range of from 0.05 to 0.5 weight percent, preferably from 0.2 to 3 weight percent. The specific surface area of the inorganic nonmagnetic powder can be in the range of from 8 to 20 m$^2$/g, preferably from 8 to 15 m$^2$/g, and still more preferably from 8 to 12 m$^2$/g. The oil absorption amount using DBP ran be in the range of from 5 to 100 mL/100 g, preferably from 10 to 80 mL/100 g, and still more preferably from 20 to 60 mL/100 g. The specific gravity can be in the range of from 1 to 12, preferably from 3 to 6. The shape may be any of acicular, spherical, polyhedral, or plate-shaped. A polyhedral shape is rather desirable due to high abrasive strength.

In addition, solid lubricants such as carbon with a particle diameter equal to or higher than 30 μm and liquid lubricants such as fatty acids, and fatty esters may be added to the magnetic layer.

The lower layer will now be described in detail. The nonmagnetic powder employed as the principal component in the nonmagnetic lower layer is characterized by being acicular in shape, having a mean major axis length equal to or less than 0.2 μm, preferably from 0.05 to 0.15 μm, and an acicular ratio lower than that of the magnetic powder in the magnetic layer. Examples of these acicular powders are $TiO_2$, hematite, α-alumina, β-alumina, γ-alumina, $ZrO_2$, $CeO_2$, $Cr_2O_3$, $SiO_2$, other oxides, and nonmagnetic metals.

The acicular ratio of the lower layer powder preferably ranges from 5 to 20, and more preferably satisfies the relation 0.3≦acicular ratio of upper layer magnetic material/acicular ratio of lower layer magnetic material≦0.9. Specifically, an acicular metal oxide with a pH equal to or higher than 5 is particularly desirable in the present invention. Such oxides adsorb well due to high adsorption on functional groups in the binder, and the resulting coating films also have good mechanical strength.

Other desirable examples of nonmagnetic powders can be that having an oil absorption capacity using DBP ranging from 5 to 100 mL/100 g, preferably from 10 to 80 mL/100 g, and still more preferably from 20 to 60 mL/100 g. The specific gravity can be in the range of from 1 to 12, with from 3 to 6 being preferred. The ignition loss is preferably equal to or less than 20 weight percent.

The Mohs' hardness of the above-mentioned nonmagnetic powder employed in the present invention is desirably equal to or higher than 4. The roughness factor of the surfaces of these powders preferably ranges from 0.8 to 1.5, more preferably from 0.9 to 1.2. The SA (stearic acid) absorption capacity of the nonmagnetic powder can be in the range of from 1 to 20 μmol/m$^2$, preferably from 2 to 15 μmol/m$^2$. The heat of wetting in 25° C. water of the lower layer nonmagnetic powder desirably falls within the range of from $2.0\times10^{-5}$ J/cm$^2$ to $6.0\times10^{-5}$ J/cm$^2$ (200 erg/cm$^2$ to 600 erg/cm$^2$). Solvents falling within this heat-of-wetting range may also be employed. The number of water molecules on the surface at 100 to 400° C. suitably ranges from 1 to 10/100 Å.

The pH of the isoelectric point in water desirably ranges from 5 to 10.

At least a portion of the surfaces of these nonmagnetic powders is desirably treated by coating with at least one compound selected from among $Al_2O_3$, $SiO_2$, $TiO_2$, $ZrO_2$, $SnO_2$, $Sb_2O_3$, and $ZnO$. The coating compounds of preference with regard to dispersion properties are $Al_2O_3$, $SiO_2$, $TiO_2$, and $ZrO_2$. These may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

In addition to the above-described acicular nonmagnetic powder, the mixing into the lower layer of from 5 to 30 parts of a granular powder with a mean particle size equal to or less than 50 nm, preferably equal to or less than 40 nm as well as a true specific gravity equal to or less than 5, per 100 parts of the above-described acicular nonmagnetic powder is desirable. $TiO_2$, hematite, alumina, $ZrO_2$, $CeO_2$, $Cr_2O_3$, $SiO_2$, other oxides, nonmagnetic metals, organic resin fillers, carbon black, and the like may be employed as the granular powder. Carbon black with a mean particle size equal to or less than 30 nm is particularly suitable.

The binder employed may be identical to that employed in the magnetic upper layer. However, functional groups (described above) improving dispersion properties are preferably incorporated and the molecular weight may be from 20,000 to 50,000, preferably from 30,000 to 50,000. When the molecular weight is excessively high, molding by calendering is less effective. Surface treatment with aromatic phosphorus compounds and alumina or the like to promote dispersion in the nonmagnetic powder is also effective. The details are described in Japanese Patent Nos. 2,566,088 and 2,634,792.

The thickness of the lower layer can be in the range of from 0.3 to 3 $\mu$m, preferably from 0.5 to 2 $\mu$m.

Examples of polyisocyanates which may be employed in the upper and lower layers of the present invention as binders are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL, manufactured by Nippon Polyurethane Industry Co. Ltd.; Takenate D-102, Takenate D-110N, Takenate D-200 and Takenate D-202, manufactured by Takeda Chemical Industries Co. Ltd.; and Desmodule L, Desmodule IL, Desmodule N and Desmodule HL, manufactured by Sumitomo Bayer Co. Ltd. They may be used singly or in combinations of two or more in both nonmagnetic and magnetic layers by exploiting differences in curing reactivity.

Examples of types of carbon black that are suitable for use in the upper layer of the present invention are: furnace black for rubber, thermal for rubber, black for coloring, and acetylene black. A specific surface area of from 5 to 500 $m^2$/g, a DBP oil absorption capacity of from 10 to 400 mL/100 g, a particle diameter of from 5 to 300 m$\mu$, a pH of from 2 to 10, a moisture content of from 0.1 to 10 weight percent, and a tap density of from 0.1 to 1 g/mL are desirable. Specific examples of types of carbon black employed in the present invention are: BLACK PEARLS 2000, 1300, 1000, 900, 800, 700 and VULCAN XC-72, manufactured by Cabot Corporation; #80, #60, #55, #50 and #35, manufactured by Asahi Carbon Co. Ltd.; #2400B, #2300, #900, #1000, #30, #40 and #10B, manufactured by Mitsubishi Kasei Kogyo Corp.; and CONDUCTEX SC, RAVEN 150, 50, 40 and 15, manufactured by Columbia Carbon Co. Ltd. The carbon black employed may be surface-treated with a dispersant and the like or grafted with resin, or have a partially graphite-treated surface. The carbon black may be dispersed in advance into the binder prior to addition to the magnetic coating liquid. These carbon blacks may be used singly or in combination.

When employing carbon black, the quantity employed preferably ranges from 0.1 to 30 weight percent with respect to the ferromagnetic powder. In the magnetic layer, Carbon black works to prevent static buildup, reduce the friction coefficient, impart light-blocking properties, enhance film strength, and the like; the properties vary with the type of carbon black. Accordingly, it is, as a matter of course, possible for carbon black used in the present invention to properly use varying the kinds, quantity and combination between the upper magnetic layer and lower layer according to the purpose on the basis of the above-mentioned characteristics such as particle size, oil absorption capacity, electrical conductivity, and pH. For example, the *Carbon Black Handbook* compiled by the Carbon Black Association may be consulted for types of carbon black suitable for use in the magnetic layer of the present invention.

Substances having lubricating effects, antistatic effects, dispersive effects, plasticizing effects, or the like may be employed as additives in the present invention. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; aliphatic amines having 8 to 22 carbon atoms; and the like.

Specific examples of the above compounds are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidolbased surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in *Surfactants Handbook* (published by Sangyo Tosho Co., Ltd.). These lubricants, antistatic agents and the like need not be 100 percent pure and may contain impurities, such as isomers, unreacted material, by-products, decomposition products, and oxides in addition to the main components. These impurities preferably comprise equal to or less than 30 weight percent, and more preferably equal to or less than 10 percent.

The lubricants and surfactants employed in the present invention may be employed differently in the lower layer and magnetic upper layer as needed based on type and quantity. For example, it is conceivable to control bleeding onto the surface through the use in the lower layer and the magnetic upper layer of fatty acids having different melting points, to control bleeding onto the surface through the use of esters having different boiling points and polarities, to improve coating stability by adjusting the amount of surfactant, and to enhance the lubricating effect by increasing the amount of lubricant added to the nonmagnetic layer; this is not limited to the examples given here. All or some of the additives used in the present invention may be added at any stage in the process of manufacturing the magnetic coating liquid. For example, they may be mixed with the ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA., Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid, manufactured by NOF Corporation; oleic acid, manufactured Kanto Chemical Co. Ltd; FAL-205 and FAL-123, manufactured by Takemoto Oil & Fat Co., Ltd.; NJLUB LO, NJLUB IPM, and Sansosyzer E4030, manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935, manufactured by Shin-Etsu Chemical Co. Ltd.; Amide P, Armide C and Armoslip CP, manufactured by Lion ArmourCo., Ltd.; Duomine TDO, manufactured by Lion Corporation; BA-41G, manufactured by Nisshin Oil Mills, Ltd.; and Profan 2012E, Newpole PE61, Ionet MS-400, Ionet MO-200, Ionet DL-200, Ionet DS-300, Ionet DS-1000 and Ionet DO-200, manufactured by Sanyo Chemical Industries, Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the lower layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably from 8 to 11.

The nonmagnetic flexible support of the magnetic recording medium of the present invention can be in the range of from 1 to 100 $\mu$m, preferably from 3 to 80 $\mu$m, in thickness. An undercoating layer for improving adhesion may be provided between the nonmagnetic flexible support and the lower layer. The undercoating layer suitably ranges from 0.01 to 2 $\mu$m, preferably from 0.02 to 0.5 $\mu$m, in thickness. Further, a backcoat layer may be provided on the reverse side from the magnetic layer on the nonmagnetic support. The thickness thereof suitably ranges from 0.1 to 2 $\mu$m, preferably from 0.3 to 1.0 $\mu$m. Known undercoating layers and backcoat layers may be employed.

Known films may be employed as the flexible nonmagnetic support in the present invention, including polyesters such as polyethylene terephthalate and polyethylene naphthalate, polyolefins, cellulose triacetate, polycarbonates, polyamides, polyimides, polyamidoimides, polysulfones, aramide, and aromatic polyamides. These supports may be subjected beforehand to corona discharge treatment, plasma treatment, adhesion enhancing treatment, heat treatment, dust removal, and the like.

In the case of a tape, the flexible support employed in the present invention has the Young's modulus in the MD direction ranging from 3.92 to 14.7 GPa (400 to 1,500 kg/mm$^2$), preferably from 4.9 to 12.74 GPa (500 to 1,300 kg/mm$^2$), the Young's modulus in the TD direction ranging from 4.9 to 19.6 GPa (500 to 2,000 kg/mm$^2$), preferably from 6.86 to 17.64 GPa (700 to 1,800 kg/mm$^2$) and the ratio of TD/MD ranging from 1/1 to 1/5, preferably from 1/1 to 1/3.

The thermal shrinkage rate of the support in the direction of running and the width direction of the tape after 30 minutes at 100° C. is preferably equal to or less than 3 percent, more preferably equal to or less than 1.5 percent. The thermal shrinkage rate after 30 min at 80° C. is equal to or less than 1 percent, preferably equal to or less than 0.5 percent. A breaking strength in both directions ranging from 49 to 980 MPa (5 to 100 kg/mm$^2$) is desirable.

The process for manufacturing the magnetic liquid of the magnetic recording medium of the present invention comprises at least a kneading step, a dispersing step, and a mixing step to be carried out, if necessary, before or after the kneading and dispersing steps. Each of the individual steps may be divided into two or more stages. All of the starting materials employed in the present invention, including the ferromagnetic powder, binders, carbon black, abrasives, antistatic agents, lubricants, solvents, and the like, may be added at the beginning of, or during, any of the steps. Moreover, the individual materials may be divided and added during two or more steps; for example, the polyurethane may be divided up and added in the kneading step, the dispersing step, and the mixing step for viscosity adjustment after dispersion.

To achieve the object of the present invention, conventionally known manufacturing techniques may of course be utilized for some of the steps. In the kneading step, only by using a kneader having a strong kneading force, such as a continuous kneader or a pressure kneader, is it possible to obtain the high residual magnetic flux density (Br) of the magnetic recording medium of the present invention. When a continuous kneader or pressure kneader is employed, the ferromagnetic powder and all or part of the binder (preferably equal to or higher than 30 percent of the entire quantity of binder) are kneaded in the range of from 15 to 500 parts per 100 parts of ferromagnetic powder. Details of the kneading treatment are described in Japanese Unexamined Patent Publication (KOKAI) Heisei No. 1-106338 and Japanese Unexamined Patent Publication (KOKAI) Showa No. 64-79274. When preparing the lower nonmagnetic layer liquid, a dispersing medium having a high specific gravity is desirably utilized, with zirconia beads being suitable.

The followings are examples of devices and methods for coating the magnetic recording medium having a multilayered structure of the present invention.

1. The lower layer is first applied with a coating device commonly employed to apply magnetic application liquids such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672.

2. The upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672.

3. The upper and lower layers are applied nearly simultaneously using an extrusion coating apparatus with a backup roller as disclosed in Japanese Unexamined Patent Publication (KOKAI) Hesei No. 2-174965.

To prevent compromising the electromagnetic characteristics or the like of the magnetic recording medium by aggregation of ferromagnetic powder, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. To obtain the magnetic recording medium of the present invention, strong orientation must be applied. A solenoid equal to or higher than 0.1 T (1,000 G) and a cobalt magnet equal to or higher than 0.2 T (2,000 G) are desirably employed together oriented with like poles opposed each other. It is also desirable to provide a suitable drying step prior to orientation so as to achieve the highest orientation property following drying. Further, when the present invention is being applied as a disk medium, an orientation method achieving random orientation is rather required.

Heat-resistant plastic rollers of epoxy, polyimide, polyamide, polyimidoamide or the like are employed as calender processing rollers. Processing may also be conducted with metal rollers. The processing temperature is preferably equal to or higher than 70° C., more preferably equal to or higher than 80° C. Linear pressure is desirably 200 kg/cm, more preferably equal to or higher than 300 kg/cm. The friction coefficient for SUS420J of the magnetic layer surface of the magnetic recording medium of the present invention and its opposite surface is preferably equal to or less than 0.5, more preferably equal to or less than 0.3. The surface specific resistivity preferably ranges from $10^4$ to $10^{12}$ Ω/sq, the modulus of elasticity at 0.5% elongation of the magnetic layer in both the running direction and the width direction preferably ranges from 0.98 to 19.6 GPa (100 to 2,000 kg/mm$^2$) and the break strength preferably ranges from 0.098 to 2.94 MPa (from 1 to 30 kg/cm$^2$). The modulus of elasticity of the magnetic recording medium in both the running direction and the longitudinal direction preferably ranges from 0.98 to 14.7 GPa (100 to 1,500 kg/mm$^2$) and the residual elongation is preferably equal to or less than 0.5 percent. The thermal shrinkage rate at any temperature equal to or less than 100° C. is preferably equal to or less than 1 percent, more preferably equal to or less than 0.5%, and most preferably equal to or less than 0.1 percent. The glass transition temperature (i.e., the temperature at which the loss elastic modulus of dynamic viscoelasticity peaks as measured at 110 Hz) of the magnetic layer is preferably equal to or higher than 50° C. and equal to or less than 120° C., and that of the lower layer preferably ranges from 0° C. to 100° C. The loss elastic modulus preferably falls within a range of from $1 \times 10^7$ to $8 \times 10^8$ Pa ($1 \times 10^8$ to $8 \times 10^9$ dyne/cm$^2$) and the loss tangent is preferably equal to or less than 0.2. Adhesion failure tends to occur when the loss tangent becomes excessively large.

The residual solvent in the magnetic layer is preferably equal to or less than 100 mg/m$^2$ and more preferably equal to or less than 10 mg/m$^2$. The void ratio in both the lower layer and the magnetic layer is preferably equal to or less than 30 volume percent, more preferably equal to or less than 20 volume percent. Although a low void ratio is preferable for attaining high output, there are some cases in which it is better to maintain a certain level depending on the purpose. For example, in magnetic recording media for data recording where repeat applications are important, higher void ratios often result in better running durability. As regards the magnetic characteristics of the magnetic recording medium of the present invention, when measured under a magnetic field of 398 kA/m (5 kOe), squareness in the tape running direction is equal to or higher than 0.70, preferably equal to or higher than 0.75, and more preferably equal to or higher than 0.85.

Squareness in the two directions perpendicular to the tape running direction is preferably equal to or less than 80 percent of the squareness in the running direction. The switching field distribution (SFD) of the magnetic layer is preferably equal to or less than 0.6.

It is appropriate on the surface of the magnetic layer that the Power Spectrum Density of Roughness is equal to or less than $0.2 \text{ nm}^2$ at a wavelength of from 1 to 5 $\mu$m in the surface roughness spectrum measured by AFM, and the Power Spectrum Density of Roughness ranges from 0.02 to 0.1 $\text{nm}^2$ at a wavelength of from 0.5 to 1.0 $\mu$m. To achieve a good C/N ratio, the lower Power Spectrum Density of Roughness is better, but to improve running durability, it is preferable to keep the Power Spectrum Density of Roughness at 0.5 to 1.0 $\mu$m wavelength to 0.02 to 1.0 $\text{nm}^2$.

The magnetic recording medium of the present invention comprises a lower layer and an upper magnetic layer. It will be readily understood that the physical characteristics of the lower layer and the magnetic layer may be changed based on the objective. For example, the magnetic layer can be imparted with a high modulus of elasticity to improve running durability while at the same time imparting to the lower layer a lower modulus of elasticity than that of the magnetic layer to improve head contact with the magnetic recording medium. What physical characteristics to impart to two or more magnetic layers can be determined by consulting techniques relating to known magnetic multilayers. For example, there are many inventions imparting a higher Hc to the upper magnetic layer than to the lower layer, such as disclosed in Japanese Examined Patent Publication (KOKOKU) Showa No. 37-2218 and Japanese Unexamined Patent Publication (KOKAI) Showa No. 58-56228. However, making the magnetic layer thin as in the present invention permits recording even on a magnetic layer of comparatively high Hc.

[Embodiments]

The detailed contents of the present invention are described specifically below through embodiments. In the embodiments, "parts" denote "weight parts".

| (1) Lower layer | |
|---|---|
| Nonmagnetic powder $\alpha$-$Fe_2O_3$ | 80 parts |
| Mean major axis length: 0.1 $\mu$m | |
| Acicular ratio: 8.5 | |
| Specific surface area by BET method: 56 $m^2$/g | |
| pH 8, $Fe_2O_3$ content: equal to or higher than 90 percent | |
| DBP oil absorption amount: 27 to 38 mL/100 g | |
| Surface treatment agent: $Al_2O_3$ | |
| Carbon black | 20 parts |
| Average primary particle diameter: 16 mm | |
| DBP oil absorption capacity: 80 mL/100 g | |
| pH: 8.0 | |
| Specific surface area by BET method: 250 $m^2$/g | |
| Volatile content: 1.5% | |
| Vinyl chloride copolymer | 10 parts |
| MR-110, manufactured by Nippon Zeon Co. Ltd. | |
| Polyester polyurethane resin | 5 parts |
| Molecular weight 35,000 | |
| Neopentylglycol/Caprolactonepolyol/ | |
| MDI (4,4'-diphenylmethane-diisocyanate) = 0.9/2.6/1 | |
| Containing $1 \times 10^{-4}$ eq/g of —$SO_3$Na group | |

| -continued | |
|---|---|
| Butyl stearate | 1 part |
| Stearic acid | 1 part |
| Methyl ethyl ketone | 100 parts |
| Cyclohexanone | 50 parts |
| Toluene | 50 parts |
| (2) Magnetic Layer | |
| Ferromagnetic metal powder | 100 parts |
| Composition Fe/Co = 75/25 (atomic ratio) | |
| Hc 191 kA/m (2,400 Oe) | |
| Specific surface area by BET method 58 $m^2$/g | |
| Crystalline size 120 A | |
| Surface treatment agent: $Al_2O_3$ | |
| Particle size (major axis length) 0.07 $\mu$m | |
| Acicular ratio 6 | |
| $\sigma$s: 108 A · $m^2$/kg | |
| Vinyl chloride copolymer | 5 parts |
| MR-110, manufactured by Nippon Zeon Co. Ltd. | |
| Polyester polyurethane resin | 3 parts |
| Neopentylglycol/Caprolactonepolyol/ | |
| MDI (4,4'-diphenylmethane-diisocyanate) = 0.9/2.6/1 | |
| Containing $1 \times 10^{-4}$ eq/g of —$SO_3$Na group | |
| $\alpha$-Alumina | 5 parts |
| Particle size 0.1 $\mu$m, surface coating compound MgO | |
| Carbon black (particle size 0.10 $\mu$m) | 0.5 part |
| Butyl stearate | 1.5 part |
| Stearic acid | 0.5 part |
| Methyl ethyl ketone | 90 parts |
| Cyclohexanone | 30 parts |
| Toluene | 60 parts |

Each of the above two coating liquids was dispersed using a sand mill after the individual components had been kneaded in a continuous kneader. Polyisocyanate was added to the dispersions obtained: three parts to the coating liquid for the lower layer, and one part to the coating liquid for the upper magnetic layer. Forty parts of a mixed solvent of methyl ethyl ketone and cyclohexanone was added to each liquid. Each liquid was then filtered using a filter having a mean pore diameter of 1 $\mu$m to prepare coating liquids for forming the lower layer and the upper magnetic layer, respectively. Simultaneous multilayer coating was conducted by applying the coating liquid for the lower layer in a manner yielding a dried thickness of 1.2 $\mu$m on a polyethylene naphthalate support having the thickness of 5.5 $\mu$m and MD and TD Young's moduli of 5.9 GPa and 8.8 GPa, and applying thereover the coating liquid for the upper magnetic layer immediately thereafter in a manner yielding a magnetic layer 0.05 $\mu$m in thickness. While the two layers were still wet, orientation was imparted with a cobalt magnet having a magnetic force of 300 mT (3,000 G) and a solenoid having a magnetic force of 150 mT (1,500 G). After drying, processing was conducted at 90° C. with a seven-stage calender comprised of only metal rollers, and slits 8 mm in width were made to manufacture an 8 mm video tape.

Evaluation Methods (1) Measurement of C/N Ratio

The C/N ratio was estimated with a drum tester. The head employed was an MIG reproduction head with a Bs of 1.2 T and a gap length of 0.22 $\mu$m. Reproduction was conducted using a shielded MR head with a shield gap of 0.2 $\mu$m where the Bs of the MR film was 1.2 T. The relative speed of the head over the medium during recording and reproduction was 10.5 m per second, a 21 MHz single-frequency signal was recorded, and the reproduction spectrum was measured using a Spectral Analyzer manufactured by Shibasoku Co., Ltd. The C/N ratio was determined as a ratio of a 21 MHz carrier output and 19 MHz noise.

(2) Still Time

The time required for the reproduction output of (1) above to drop 6 dB was measured in a 23° C., 10 percent humidity environment. A rating of "OK" means it was equal to or more than 60 minutes.

(3) Thickness Measurement

The sample tape was cut with a diamond cutter to a thickness of about 0.1 μm in the longitudinal direction and measured and photographed at a magnification of 100,000× with a transmission electron microscope. Lines were drawn at the outer surface of the magnetic layer and the interface between the magnetic layer and the lower layer, and measurements were made with an IBAS2 Image Processor from Zeiss Co., Ltd. When the measurement length was 21 cm, 85 to 300 measurements were made, and the average value d and standard deviation σ were calculated.

(4) Determination of the Number of Abrasive Protrusions on the Magnetic Layer Surface by AFM The number of surface protrusions in a 15 μm square (225 μm$^2$) of the magnetic layer was measured by AFM and the number of protrusions 5 to 10 nm in height was determined. The number of spots at which abrasive particles were exposed among the protrusions 5 to 10 nm in height was counted to get the number of abrasive protrusions 5 to 10 nm in height.

Embodiment 2 is an example where the thickness of the magnetic layer was increased relative to Embodiment 1. With the increased magnetic layer thickness, magnetic energy dropped and the C/N ratio decreased. However, a better C/N ratio was exhibited than by Comparative Example 2.

Embodiment 3 is an example where the thickness of the magnetic layer was increased relative to Embodiment 1. With the increased magnetic layer thickness, magnetic energy dropped and the C/N ratio increased. The number of abrasive protrusions decreased somewhat to 18/225 μm$^2$, but still met the still time level.

Embodiment 4 is an example where the major axis length was shortened relative to Embodiment 1, a magnetic material of low σ s was employed, and the magnetic layer was thin (this was the case with the lowest magnetic energy). The Hc dropped in conjunction with the short major axis length and low σs. The drop in magnetic energy caused the C/N ratio to drop. Still time was ensured by maintaining almost the same number of abrasive protrusions (23/225 μm$^2$) as in Embodiment 1.

Embodiment 5 is an example where a magnetic material with a longer major axis length and a higher σs than in Embodiment 1 was employed, and the thickness of the magnetic layer was increased (this had the highest magnetic

TABLE 1

|  |  | Embod. 1 | Embod. 2 | Embod. 3 | Embod. 4 | Embod. 5 | Embod. 6 | Embod. 7 | Comp. 1 | Comp. 2 |
|---|---|---|---|---|---|---|---|---|---|---|
| Thickness | Magnetic layer (μm) | 0.05 | 0.03 | 0.1 | 0.03 | 0.08 | 0.05 | → | 0.05 | 0.13 |
| Magnetic material | Mean major axis length (μm) | 0.07 | → | → | 0.06 | 0.095 | 0.07 | → | 0.07 | 0.12 |
|  | σ s(A·m$^2$/kg) | 108 | → | → | 93 | 118 | 108 | → | 108 | → |
|  | Hc (kA/m) | 191 | → | → | 171 | 193 | 191 | → | 191 | 159 |
|  | Crystal volume (nm$^3$) | 6,700 | → | → | 5,000 | 12,500 | 6,700 | → | 6,700 | 24,100 |
| Abrasive protrusions (no/225 μm$^2$) |  | 20 | 24 | 18 | 23 | 22 | 19 | → | 5.5 | 43 |
| Abrasive | Type | α-Alumina | → | → | → | → | → | → | → | → |
|  | Amount added (weight parts) | 10 | → | → | → | → | 9 | 13 | 6 | 19 |
| Magnetic material volume fill rate (%) |  | 39.5 | → | → | 43 | 38 | 28 | 39.5 | 42 | 27.9 |
| Magnetic material volume fill rate (%) |  | 8.6 | → | → | 9.3 | 8.2 | 6.1 | 11.4 | 6 | 14.6 |
| Evaluation results | CNR (dB) | −0.5 | −1.5 | 0 | −3.2 | −2 | −1.8 | −2.5 | 0 | −9.3 |
|  | Still time | OK | OK | OK | OK | OK | OK | OK | Equal to or less than 5 min. | OK |

DESCRIPTION OF EMBODIMENTS AND COMPARATIVE EXAMPLES

Comparative Example 1 (0 dB) was adopted as the base for electromagnetic characteristics. Although a high C/N ratio was obtained in Comparative Example 1, the requisite still time level was not achieved.

Embodiment 1 is an example where the quantity of abrasive increased relative to Comparative Example 1 and the number of abrasive protrusions was 20/225 μm$^2$. The C/N ratio decreased by 0.5 dB, but a better C/N ratio was exhibited than by Comparative Example 2, which had 43 abrasive protrusions per 225 μm$^2$, and the still time level was met.

energy). The MR head was saturated and the noise component increased, causing the C/N ratio to drop.

Embodiment 6 is an example where the quantity of binder was increased and the magnetic material volume fill rate was decreased relative to Embodiment 1. The C/N ratio dropped.

Embodiment 7 is an example where the quantity of abrasive was increased and the abrasive volume fill rate was increased relative to Embodiment 1. The magnetic material volume fill rate dropped relatively and the C/N ratio dropped.

The present disclosure relates to the subject matter contained in Japanese Patent Application No. 2000-264329 filed on Aug. 31, 2000, which is expressly incorporated herein by reference in its entirety.

What is claimed is:

1. A magnetic recording medium which comprises a lower layer comprising a nonmagnetic powder and a binder and a magnetic layer comprising a ferromagnetic powder, an abrasive and a binder provided in this order on a nonmagnetic flexible support, wherein said magnetic layer has a mean thickness d ranging from 0.01 to 0.1 μm, said ferromagnetic powder is an acicular ferromagnetic alloy powder having a mean major axis length equal to or less than 0.1 μm and a saturation magnetization σs equal to or less than 120 A·m$^2$/kg, and the number of abrasive protrusions ranging in height from 5 to 10 nm on the surface of said magnetic layer ranges from 15 to 25/225 μm$^2$.

2. The magnetic recording medium of claim 1, wherein said ferromagnetic powder has a mean particle volume of from 1,500 to 15,000 nm$^3$.

3. The magnetic recording medium of claim 1, wherein said ferromagnetic powder has a coercivity Hc equal to or higher than 167 kA/m.

4. The magnetic recording medium of claim 1, wherein particles of said ferromagnetic powder existing in said magnetic layer has a fill rate by volume equal to or higher than 30 percent.

5. The magnetic recording medium of claim 1, wherein said mean thickness d of said magnetic layer ranges from 0.03 to 0.08 μm.

6. The magnetic recording medium of claim 1, wherein said magnetic layer thickness d satisfies a relation of σ/d≦0.5 (σ is a standard deviation of the thickness d).

7. The magnetic recording medium of claim 1, wherein said magnetic layer has a level of residual magnetization Φr ranging from 5 to 50 mT·μm.

8. The magnetic recording medium of claim 1, wherein said ferromagnetic powder has a saturation magnetization σs ranging from 80 to 120 A·m$^2$/kg.

9. The magnetic recording medium of claim 1, wherein said acicular ferromagnetic alloy powder has a minor axis length ranging from 0.005 to 0.02 μm.

10. The magnetic recording medium of claim 1, wherein said acicular ferromagnetic alloy powder has an acicular ratio (major axis length divided by minor axis length) ranging from 3 to 15.

* * * * *